United States Patent
Talwar et al.

(10) Patent No.: US 12,450,060 B1
(45) Date of Patent: Oct. 21, 2025

(54) SHARING LOOP CACHE INSTANCES AMONG MULTIPLE THREADS IN PROCESSOR DEVICES

(71) Applicant: QUALCOMM Incorporated, San Diego, CA (US)

(72) Inventors: Puneet Talwar, Austin, TX (US); Stephen Shannon, Austin, TX (US); Suresh Kumar Venkumahanti, Austin, TX (US); Karan Suri, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/817,548

(22) Filed: Aug. 28, 2024

(51) Int. Cl.
*G06F 9/38* (2018.01)
*G06F 9/30* (2018.01)

(52) U.S. Cl.
CPC ...... *G06F 9/30065* (2013.01); *G06F 9/30047* (2013.01); *G06F 9/381* (2013.01); *G06F 9/3851* (2013.01)

(58) Field of Classification Search
CPC .............................. G06F 9/381; G06F 9/3851
See application file for complete search history.

(56) References Cited

U.S. PATENT DOCUMENTS

| | | | |
|---|---|---|---|
| 9,891,923 B2 * | 2/2018 | Chen | G06F 12/0875 |
| 11,256,505 B2 * | 2/2022 | Annamalai | G06F 9/30189 |
| 12,217,059 B1 * | 2/2025 | Freij | G06F 9/381 |
| 2006/0107028 A1 * | 5/2006 | Meuwissen | G06F 9/325 |
| | | | 712/E9.035 |
| 2008/0294882 A1 * | 11/2008 | Jayapala | G06F 9/325 |
| | | | 712/E9.058 |
| 2009/0113192 A1 * | 4/2009 | Hall | G06F 9/381 |
| | | | 712/241 |
| 2013/0339699 A1 * | 12/2013 | Blasco-Allue | G06F 9/382 |
| | | | 712/241 |
| 2014/0189331 A1 * | 7/2014 | Lipshits | G06F 9/3844 |
| | | | 712/241 |

(Continued)

OTHER PUBLICATIONS

Ahn, J. et al., "LASIC: Loop-Aware Sleepy Instruction Caches Based on STT-RAM Technology," IEE Transactions on Very Large Scale Integration (VLSI) Systems, vol. 22, No. 5, May 2014, IEEE, pp. 1197-1201.

(Continued)

*Primary Examiner* — Jacob Petranek
(74) *Attorney, Agent, or Firm* — W&T

(57) ABSTRACT

Sharing loop cache instances among multiple threads in processor devices is disclosed herein. In some aspects, a processor device provides a loop cache controller circuit that is configured to detect a first iteration of a loop body, comprising a plurality of loop instructions, in an instruction stream executed by a first thread. The loop cache controller circuit determines that the loop instructions were previously stored in a loop cache instance associated with a second thread, and, in response, sets a use bit corresponding to the first thread of a use bit register corresponding to the loop cache instance. Upon detecting a subsequent iteration of the loop body by the first thread, the loop cache controller circuit retrieves the plurality of loop instructions from the loop cache instance instead of an instruction cache, based on the use bit corresponding to the first thread.

20 Claims, 10 Drawing Sheets

(56) References Cited

U.S. PATENT DOCUMENTS

2015/0089141 A1\* 3/2015 Chen .................. G06F 9/30047
　　　　　　　　　　　　　　　　　　　　　　　711/125
2023/0393853 A1\* 12/2023 Al Sheikh ............... G06F 9/325

OTHER PUBLICATIONS

Rawlins, M. et al., "On the Interplay of Loop Caching, Code Compression, and Cache Configuration," 16th Asia and South Pacific Design Automation Conference (ASP-DAC 2011), Jan. 25-28, 2011, Yokohama, Japan, IEEE, 6 pages.

\* cited by examiner

SHARING LOOP CACHE INSTANCES AMONG MULTIPLE THREADS IN PROCESSOR DEVICES

TECHNICAL FIELD

The technology of the disclosure relates generally to efficient processing of loops by processor devices, and, in particular, to the use of loop cache instances to optimize the handling of loops in the context of multithread processing.

BACKGROUND

Conventional processor devices may accomplish pipeline optimization and realize power savings by providing special handling for loops. As used herein, a "loop" refers to any sequence of computer executable instructions in an instruction stream whose processing is repeated sequentially in back-to-back operations. For example, loops may result from software loop constructs, which are compiled into groups of instructions that are repeatedly and sequentially processed. FIG. 1 illustrates an example of an instruction stream 100 that comprises an exemplary loop 102. The loop 102 in the example of FIG. 1 is a "while" loop that begins with a while instruction 104 that, when processed, determines whether a specified condition evaluates as true or false. If the condition of the while instruction 104 is determined to evaluate as true, instructions 106-112 in the loop 102 are executed, and will continue to be executed as a loop for as long as the condition of the while instruction 104 evaluates as true. If the condition of the while instruction 104 is determined to evaluate as false, the while instruction 104 is considered to be an exit branch instruction, and the loop 102 exits to a next instruction 114 at an exit target address.

If a loop, such as the loop 102 in FIG. 1, can be detected within an instruction stream, the instructions making up the loop can be cached and retrieved for subsequent iterations of the loop, without the need to re-fetch and re-decode those instructions. This is because each subsequent iteration of the loop necessarily involves the same sequence of instructions that will have already been fetched, decoded, and cached in an instruction cache for the previous iteration of the loop. In this regard, many conventional processors provide a loop cache controller circuit to detect, cache, and retrieve loop instructions. Because read accesses to the instruction cache of a processor device account for a significant portion of power consumption of the processor device, power savings may be realized by retrieving loop instructions from the loop cache controller circuit instead of the instruction cache.

In conventional operation, a loop cache controller circuit provides multiple loop cache instances that each store loop instructions for respective threads executing on the processor device. When a loop body (i.e., the loop instructions that make up a loop in an instruction stream) is detected in an instruction stream executed by a thread, the thread is mapped to an available loop cache instance by the loop cache controller circuit. The loop cache instance is then used to cache and retrieve the loop body for subsequent iterations of the loop executed by that thread. When the loop exits, the loop cache controller circuit deallocates the loop cache instance for subsequent reuse. However, it is desirable to further optimize the handling of loops by the loop cache controller circuit in the context of multithread processing to realize additional power savings.

SUMMARY OF THE DISCLOSURE

Aspects disclosed in the detailed description include sharing loop cache instances among multiple threads in processor devices. Related apparatus, methods, and computer-readable media are also disclosed. In this regard, in some exemplary aspects disclosed herein, a processor device provides a loop cache controller circuit, along with a plurality of loop cache instances and a plurality of use bit registers that each corresponds to one of the loop cache instances. Each use bit register includes a plurality of use bits that each corresponds to a thread of a plurality of threads. In exemplary operation, the loop cache controller circuit detects a first iteration of a loop body that comprises a plurality of loop instructions in an instruction stream that is executed by a first thread of the plurality of threads. The loop cache controller circuit determines (e.g., based on based on a plurality of tag registers and a plurality of valid indicators of the loop cache instance) that the plurality of loop instructions were previously stored in a loop cache instance associated with a second thread of the plurality of threads. In response, the loop cache controller circuit sets a use bit corresponding to the first thread of a use bit register corresponding to the loop cache instance to indicate that the first thread is also mapped to the loop cache instance, and, in some aspects, may also set a valid indicator of a plurality of valid indicators of the loop cache instance. On a subsequent iteration of the loop body by the first thread, the loop cache controller circuit retrieves the plurality of loop instructions from the loop cache instance instead of an instruction cache, based on the use bit corresponding to the first thread.

Some aspects may provide that, subsequent to a last iteration of the loop body by the first thread, the loop cache controller circuit clears the use bit corresponding to the first thread of the use bit register. According to some aspects, the loop cache controller circuit may detect an eviction of a loop instruction of the plurality of loop instructions from the instruction cache, and, in response, may clear a valid indicator corresponding to the loop instruction.

In some aspects, the loop cache controller circuit may populate the loop cache instance by detecting a first iteration of a loop body in an instruction stream executed by the second thread of the plurality of threads. The loop cache controller circuit determines that the plurality of loop instructions were not previously stored in a loop cache instance of a plurality of loop cache instances. In response, the loop cache controller circuit sets a use bit corresponding to the second thread of the use bit register corresponding to the loop cache instance, and stores the plurality of loop instructions in the loop cache instance. On a subsequent iteration of the loop body by the second thread, the loop cache controller circuit retrieves the plurality of loop instructions from the loop cache instance instead of the instruction cache, based on the use bit corresponding to the second thread. In some aspects, subsequent to a last iteration of the loop body by the second thread, the loop cache controller circuit clears the use bit corresponding to the second thread of the use bit register corresponding to the loop cache instance.

In another aspect, a processor device is disclosed. The processor device comprises a plurality of loop cache instances, and a plurality of use bit registers that each correspond to a loop cache instance of the plurality of loop cache instances, and comprise a plurality of use bits that each correspond to a thread of a plurality of threads. The processor device further comprises a loop cache controller circuit that is configured to detect a first iteration of a loop body, comprising a plurality of loop instructions, in an instruction stream executed by a first thread of the plurality of threads. The loop cache controller circuit is further configured to determine that the plurality of loop instructions were previously stored in a loop cache instance associated with a second thread of the plurality of threads of the plurality of loop cache instances. The loop cache controller circuit is also configured to, responsive to determining that the plurality of loop instructions were previously stored in the loop cache instance associated with the second thread, set a use bit corresponding to the first thread of a use bit register corresponding to the loop cache instance of the plurality of use bit registers. The loop cache controller circuit is additionally configured to, on a subsequent iteration of the loop body by the first thread, retrieve the plurality of loop instructions from the loop cache instance instead of an instruction cache, based on the use bit corresponding to the first thread.

In another aspect, a processor device is disclosed. The processor device comprises means for detecting a first iteration of a loop body, comprising a plurality of loop instructions, in an instruction stream executed by a first thread of a plurality of threads. The processor device further comprises means for determining that the plurality of loop instructions were previously stored in a loop cache instance associated with a second thread of the plurality of threads of a plurality of loop cache instances. The processor device also comprises means for setting a use bit corresponding to the first thread of a use bit register corresponding to the loop cache instance of a plurality of use bit registers, responsive to determining that the plurality of loop instructions were previously stored in the loop cache instance associated with the second thread, wherein each use bit register of the plurality of use bit registers corresponds to a loop cache instance of the plurality of loop cache instances, and each use bit register comprises a plurality of use bits that each correspond to a thread of the plurality of threads. The processor device additionally comprises means for retrieving the plurality of loop instructions from the loop cache instance instead of an instruction cache, based on the use bit corresponding to the first thread, on a subsequent iteration of the loop body by the first thread.

In another aspect, a method for sharing loop cache instances among multiple threads in processor devices is disclosed. The method comprises detecting, by a loop cache controller circuit of a processor device, a first iteration of a loop body, comprising a plurality of loop instructions, in an instruction stream executed by a first thread of a plurality of threads. The method further comprises determining, by the loop cache controller circuit, that the plurality of loop instructions were previously stored in a loop cache instance associated with a second thread of the plurality of threads of a plurality of loop cache instances. The method also comprises, responsive to determining that the plurality of loop instructions were previously stored in the loop cache instance associated with the second thread, setting, by the loop cache controller circuit, a use bit corresponding to the first thread of a use bit register corresponding to the loop cache instance of a plurality of use bit registers, wherein each use bit register of the plurality of use bit registers corresponds to a loop cache instance of the plurality of loop cache instances, and each use bit register comprises a plurality of use bits that each correspond to a thread of the plurality of threads. The method additionally comprises, on a subsequent iteration of the loop body by the first thread, retrieving, by the loop cache controller circuit, the plurality of loop instructions from the loop cache instance instead of an instruction cache, based on the use bit corresponding to the first thread.

In another aspect, a non-transitory computer-readable medium is disclosed. The non-transitory computer-readable medium stores computer-executable instructions that, when executed by a processor device, cause the processor device to detect, a first iteration of a loop body, comprising a plurality of loop instructions, in an instruction stream executed by a first thread of a plurality of threads. The computer-executable instructions further cause the processor device to determine that the plurality of loop instructions were previously stored in a loop cache instance associated with a second thread of the plurality of threads of a plurality of loop cache instances. The computer-executable instructions also cause the processor device to, responsive to determining that the plurality of loop instructions were previously stored in the loop cache instance associated with the second thread, set a use bit corresponding to the first thread of a use bit register corresponding to the loop cache instance of a plurality of use bit registers, wherein each use bit register of the plurality of use bit registers corresponds to a loop cache instance of the plurality of loop cache instances, and each use bit register comprises a plurality of use bits that each correspond to a thread of the plurality of threads. The computer-executable instructions additionally cause the processor device to, on a subsequent iteration of the loop body by the first thread, retrieve the plurality of loop instructions from the loop cache instance instead of an instruction cache, based on the use bit corresponding to the first thread.

DETAILED DESCRIPTION

Figure 1:
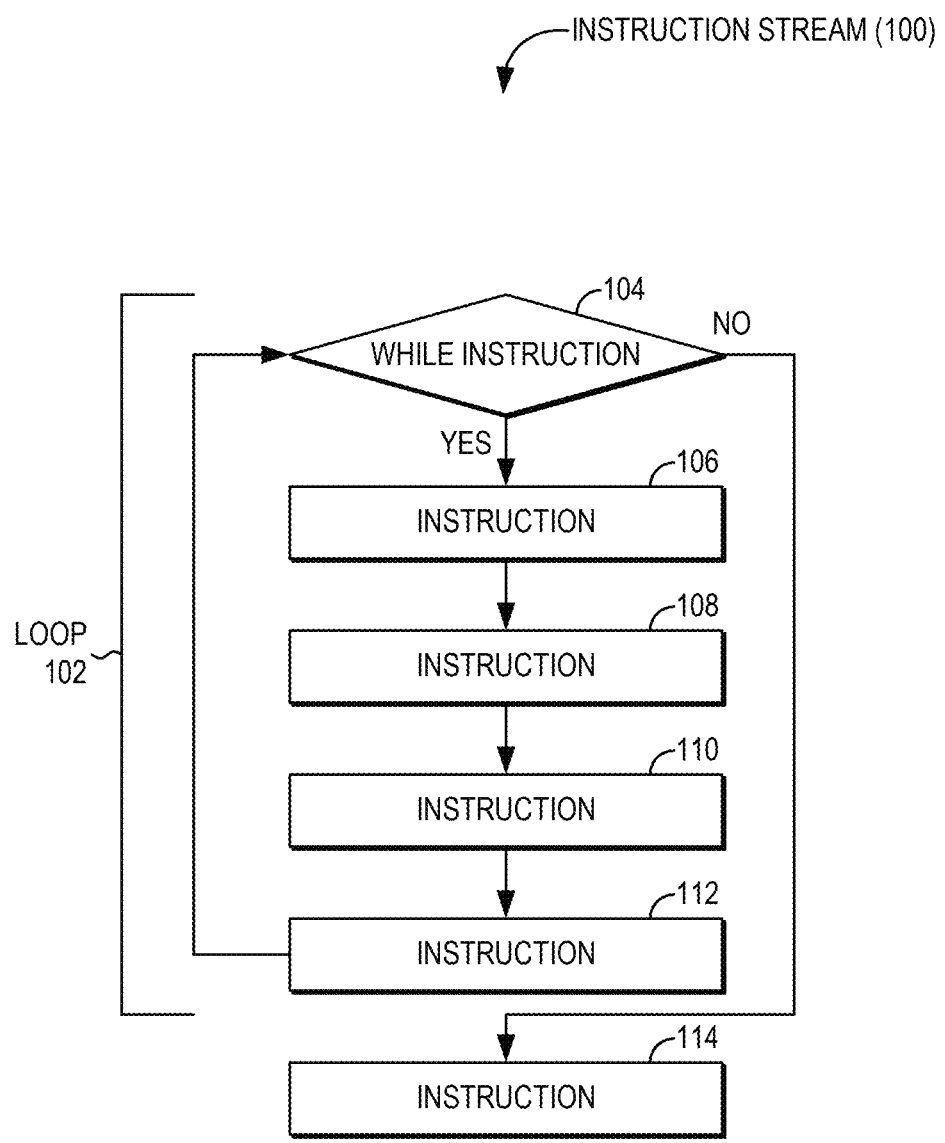
FIG. 1 is a diagram of an exemplary loop of computer executable instructions in an instruction stream.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like used herein are intended to distinguish between similarly named elements, and do not indicate an ordinal relationship between such elements unless otherwise expressly indicated.

Aspects disclosed in the detailed description include sharing loop cache instances among multiple threads in processor devices. Related apparatus, methods, and computer-readable media are also disclosed. In this regard, in some exemplary aspects disclosed herein, a processor device provides a loop cache controller circuit, along with a plurality of loop cache instances and a plurality of use bit registers that each corresponds to one of the loop cache instances. Each use bit register includes a plurality of use bits that each corresponds to a thread of a plurality of threads. In exemplary operation, the loop cache controller circuit detects a first iteration of a loop body that comprises a plurality of loop instructions in an instruction stream that is executed by a first thread of the plurality of threads. The loop cache controller circuit determines (e.g., based on based on a plurality of tag registers and a plurality of valid indicators of the loop cache instance) that the plurality of loop instructions were previously stored in a loop cache instance associated with a second thread of the plurality of threads. In response, the loop cache controller circuit sets a use bit corresponding to the first thread of a use bit register corresponding to the loop cache instance to indicate that the first thread is also mapped to the loop cache instance, and, in some aspects, may also set a valid indicator of a plurality of valid indicators of the loop cache instance. On a subsequent iteration of the loop body by the first thread, the loop cache controller circuit retrieves the plurality of loop instructions from the loop cache instance instead of an instruction cache, based on the use bit corresponding to the first thread.

Some aspects may provide that, subsequent to a last iteration of the loop body by the first thread, the loop cache controller circuit clears the use bit corresponding to the first thread of the use bit register. According to some aspects, the loop cache controller circuit may detect an eviction of a loop instruction of the plurality of loop instructions from the instruction cache, and, in response, may clear a valid indicator corresponding to the loop instruction.

In some aspects, the loop cache controller circuit may populate the loop cache instance by detecting a first iteration of a loop body in an instruction stream executed by the second thread of the plurality of threads. The loop cache controller circuit determines that the plurality of loop instructions were not previously stored in a loop cache instance of a plurality of loop cache instances. In response, the loop cache controller circuit sets a use bit corresponding to the second thread of the use bit register corresponding to the loop cache instance, and stores the plurality of loop instructions in the loop cache instance. On a subsequent iteration of the loop body by the second thread, the loop cache controller circuit retrieves the plurality of loop instructions from the loop cache instance instead of the instruction cache, based on the use bit corresponding to the second thread. In some aspects, subsequent to a last iteration of the loop body by the second thread, the loop cache controller circuit clears the use bit corresponding to the second thread of the use bit register corresponding to the loop cache instance.

Figure 2:
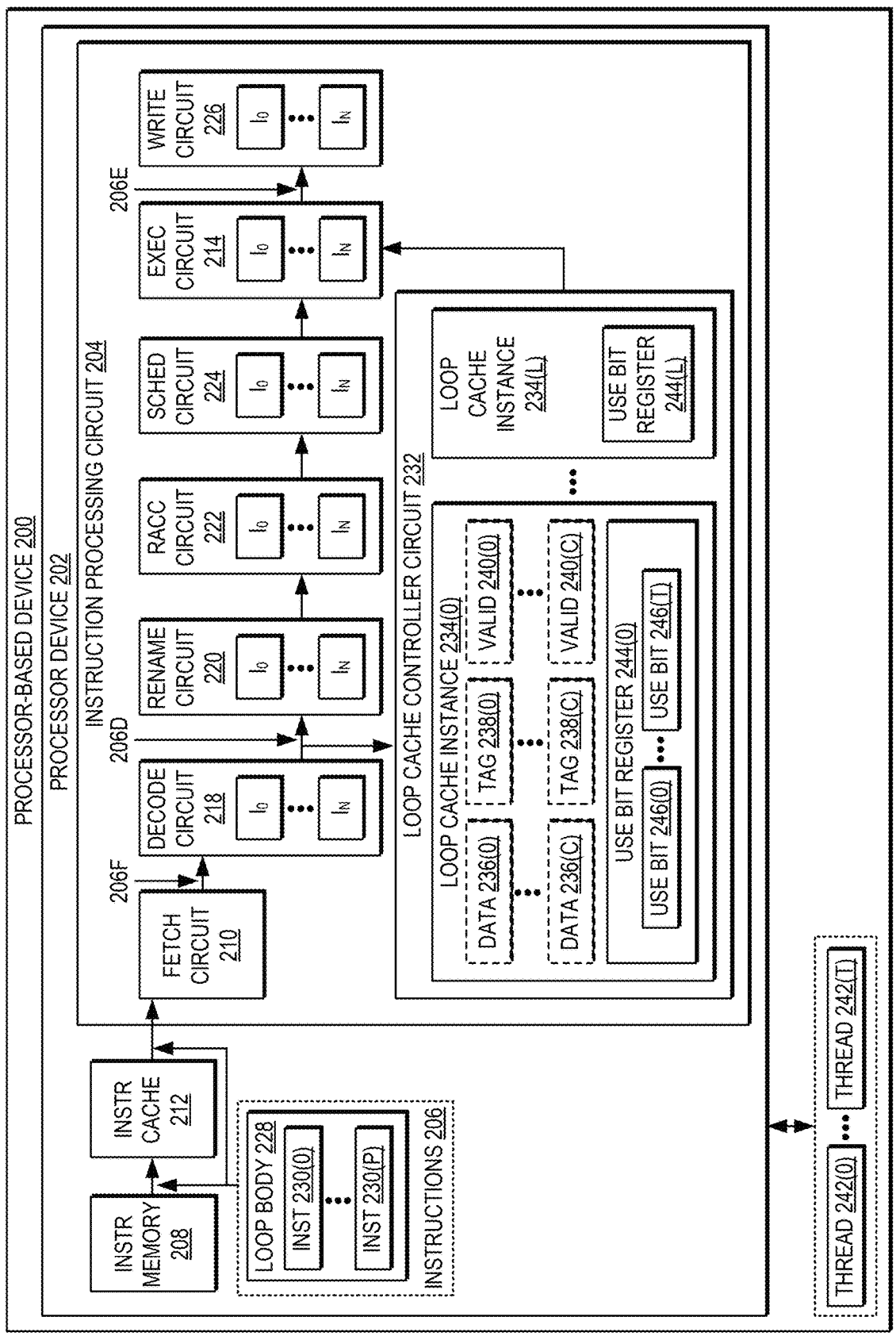
FIG. 2 is a diagram of an exemplary processor-based system that includes a processor with an instruction processing circuit that includes a loop cache controller circuit configured to enable sharing of loop cache instances among multiple threads, according to some aspects.

In this regard, FIG. 2 is a diagram of an exemplary processor-based device 200 that includes a processor device 202. The processor device 202, which also may be referred to as a "processor core" or a "central processing unit (CPU) core," may be an in-order or an out-of-order processor (OoP), and/or may be one of a plurality of processor devices 202 provided by the processor-based device 200. In the example of FIG. 2, the processor device 202 includes an instruction processing circuit 204 that includes one or more instruction pipelines $I_0$-$I_N$ for processing instructions 206 fetched from an instruction memory (captioned as "INSTR MEMORY" in FIG. 2) 208 by a fetch circuit 210 for execution. The instruction memory 208 may be provided in or as part of a system memory in the processor-based device 200, as a non-limiting example. An instruction cache (captioned as "INSTR CACHE" in FIG. 2) 212 may also be provided in the processor device 202 to cache the instructions 206 fetched from the instruction memory 208 to reduce latency in the fetch circuit 210.

The fetch circuit 210 in the example of FIG. 2 is configured to provide the instructions 206 as fetched instructions 206F into the one or more instruction pipelines $I_0$-$I_N$ in the instruction processing circuit 204 to be pre-processed, before the fetched instructions 206F reach an execution circuit (captioned as "EXEC CIRCUIT" in FIG. 2) 214 to be executed. The instruction pipelines $I_0$-$I_N$ are provided across different processing circuits or stages of the instruction processing circuit 204 to pre-process and process the fetched instructions 206F in a series of steps that can be performed concurrently to increase throughput prior to execution of the fetched instructions 206F by the execution circuit 214.

With continuing reference to FIG. 2, the instruction processing circuit 204 includes a decode circuit 218 configured to decode the fetched instructions 206F fetched by the fetch circuit 210 into decoded instructions 206D to determine the instruction type and actions required. The instruction type and action required encoded in the decoded instruction 206D may also be used to determine in which instruction pipeline $I_0$-$I_N$ the decoded instructions 206D should be placed. In this example, the decoded instructions 206D are placed in one or more of the instruction pipelines $I_0$-$I_N$ and are next provided to a rename circuit 220 in the instruction processing circuit 204. The rename circuit 220 is configured to determine if any register names in the decoded instructions 206D should be renamed to decouple any register dependencies that would prevent parallel or out-of-order processing.

The instruction processing circuit 204 in the processor device 202 in FIG. 2 also includes a register access circuit (captioned as "RACC CIRCUIT" in FIG. 2) 222. The register access circuit 222 is configured to access a physical register in a physical register file (PRF) (not shown) based on a mapping entry mapped to a logical register in a register mapping table (RMT) (not shown) of a source register operand of a decoded instruction 206D to retrieve a produced value from an executed instruction 206E in the execution circuit 214. The register access circuit 222 is also configured to provide the retrieved produced value from an executed instruction 206E as the source register operand of a decoded instruction 206D to be executed.

Also, in the instruction processing circuit 204, a scheduler circuit (captioned as "SCHED CIRCUIT" in FIG. 2) 224 is provided in the instruction pipeline $I_0$-$I_N$ and is configured to store decoded instructions 206D in reservation entries until all source register operands for the decoded instruction 206D are available. The scheduler circuit 224 issues decoded instructions 206D that are ready to be executed to the execution circuit 214. A write circuit 226 is also provided in the instruction processing circuit 204 to write back or commit produced values from executed instructions 206E to memory (such as the PRF), cache memory, or system memory.

As seen in FIG. 2, the instructions 206 include a loop body 228 that comprises a plurality of loop instructions (captioned as "INST" in FIG. 2) 230(0)-230(P). The loop instructions 230(0)-230(P) are repeatedly processed sequentially in a back-to-back manner. If the loop instructions 230(0)-230(P) of the loop body 228 can be detected when the loop instructions 230(0)-230(P) are processed within one of the instruction pipelines $I_0$-$I_N$, the loop instructions 230 (0)-230(P) can be cached and executed in processing stages in the instruction pipeline $I_0$-$I_N$ without having to re-fetch and/or re-decode the loop instructions 230(0)-230(P) for subsequent iterations of the loop body 228.

In this regard, the instruction processing circuit 204 in this example includes a loop cache controller circuit 232 that is configured to perform loop caching. The loop cache controller circuit 232 is configured to detect loop bodies such as the loop body 228 among the instructions 206, to cache the loop instructions 230(0)-230(P) in the detected loop body 228, and to retrieve the cached loop instructions 230(0)-230 (P) in an instruction pipeline $I_0$-$I_N$ for subsequent iterations of the loop. In this manner, the loop cache controller circuit 232 enables the instruction processing circuit 204 to avoid or reduce the need to retrieve the instructions 206 in the loop body 228 from the instruction cache 212.

The loop cache controller circuit 232 in the instruction processing circuit 204 of the processor device 202 includes a plurality of loop cache instances 234(0)-234(L), each of which can be used to cache loop instructions such as the loop instructions 230(0)-230(P). As shown in FIG. 2, in some aspects, the loop cache instance 234(0) of the loop cache controller circuit 232 comprises a plurality of data registers (captioned as "DATA" in FIG. 2) 236(0)-236(C), a plurality of tag registers (captioned as "TAG" in FIG. 2) 238(0)-238 (C), and a plurality of valid indicators (captioned as "VALID" in FIG. 2) 240(0)-240(C). Each of the data registers 236(0)-236(C) in such aspects is configured to store data (e.g., a cache line, as a non-limiting example) retrieved from the instruction cache 212. The tag registers 238(0)-238(C) in such aspects each store identifying information (e.g., based on a set number and a way number of the instruction cache 212, as non-limiting examples) for the data in the corresponding data registers 236(0)-236(C), while the valid indicators 240(0)-240(C) each store a Boolean value indicating whether the data stored in the corresponding data registers 236(0)-236(C) is valid. Although not shown in FIG. 2 for the sake of clarity, it is to be understood that other loop cache instances among the plurality of loop cache instances 234(0)-234(L) include elements corresponding to the data registers 236(0)-236(C), the tag registers 238(0)-238(C), and the valid indicators 240(0)-240(C) of the loop cache instance 234(0).

In conventional operation, the processor device 202 executes a plurality of threads 242(0)-242(T) that perform parallel execution of the instructions 206. When a thread such as the thread 242(0) encounters a first iteration of the loop body 228, the loop cache controller circuit 232 detects the loop body 228 and allocates a loop cache instance such as the loop cache instance 234(0) to the thread 242(0). Upon detecting a second iteration of the loop body 228 to be executed by the thread 242(0), the loop cache controller circuit 232 stores the loop instructions 230(0)-230(P) retrieved from the instruction cache 212 in the loop cache instance 234(0). Finally, upon detecting a subsequent iteration of the loop body 228 to be executed by the thread 242(0), the loop cache controller circuit 232 retrieves the loop instructions 230(0)-230(P) from the loop cache instance 234(0) instead of from the instruction cache 212. After execution of a last iteration of the loop body 228 by the thread 242(0), the loop cache controller circuit 232 deallocates the loop cache instance 234(0), making it available for future use by the threads 242(0)-242(T).

Conventional loop cache controller circuit operation such as that described above results in power savings by avoiding access to the instruction cache 212. However, in such conventional usage, each of the loop cache instances 234 (0)-234(L) can be associated with only a single one of the threads 242(0)-242(T) executed by the processor device 202. Consequently, if more than one of the threads 242(0)-242(T) are executing the loop body 228 at a time, the loop cache controller circuit 232, if operating conventionally, would need to allocate multiple loop cache instances 234 (0)-234(L) to cache the same loop instructions 230(0)-230 (P). This results in inefficient operation and unrealized power savings.

Accordingly, the loop cache controller circuit 232 of FIG. 2 is configured to provide sharing of the loop cache instances 234(0)-234(L) among multiple threads 242(0)-242(T). As seen in FIG. 2, the loop cache instances 234(0)-234(L) comprise corresponding use bit registers 244(0)-244(L). Each of the use bit registers 244(0)-244(L), such as the use bit register 244(0) shown in FIG. 2, comprises a plurality of use bits (such as the use bits 246(0)-246(T)) corresponding to the threads 242(0)-242(T). The use bit registers 244(0)-244(L) are used by the loop cache controller circuit 232 to track which of the threads 242(0)-242(T) are associated with each loop cache instance 234(0)-234(L). In exemplary operation, when the loop cache controller circuit 232 detects that the loop body 228 is encountered by a thread such as the thread 242(T), the loop cache controller circuit 232 checks to see whether the loop instructions 230(0)-230(P) were previously stored in a loop cache instance 234(0)-234(L) (e.g., a loop cache instance such as the loop cache instance 234(0) that is already associated with another thread such as the thread 242(0)). If so, the loop cache controller circuit 232 sets the use bit 246(T) corresponding to the thread 242(T) in the use bit register 244(0). On subsequent iterations of the loop body 228 by the thread 242(T), the loop cache controller circuit 232 retrieves the loop instructions 230(0)-230 (P) from the loop cache instance 234(0) instead of the instruction cache 212 based on the use bit 246(T) being set.

FIGS. 3A-3D illustrate operations performed by the loop cache controller circuit 232 of FIG. 2 for sharing the loop cache instance 234(0) of FIG. 2 between both the thread 242(0) and the thread 242(T) of FIG. 2. In FIGS. 3A-3D, an instruction stream 300(0) is shown being executed by the thread 242(0), while an instruction stream 300(1) is shown being executed by the thread 242(T). Both the instruction streams 300(0), 300(1) include the loop body 228 comprising the plurality of loop instructions 230(0)-230(P). In addition, the instruction cache 212, the loop cache instance 234(0), the use bit register 244(0), and the use bits 246(0)-246(T) are shown in FIGS. 3A-3D. At the beginning of the sequence shown in FIG. 3A, all of the use bits 246(0)-246(T) are set to a value of zero (0) to indicate that the loop cache instance 234(0) is not associated with any thread.

Figure 3A:
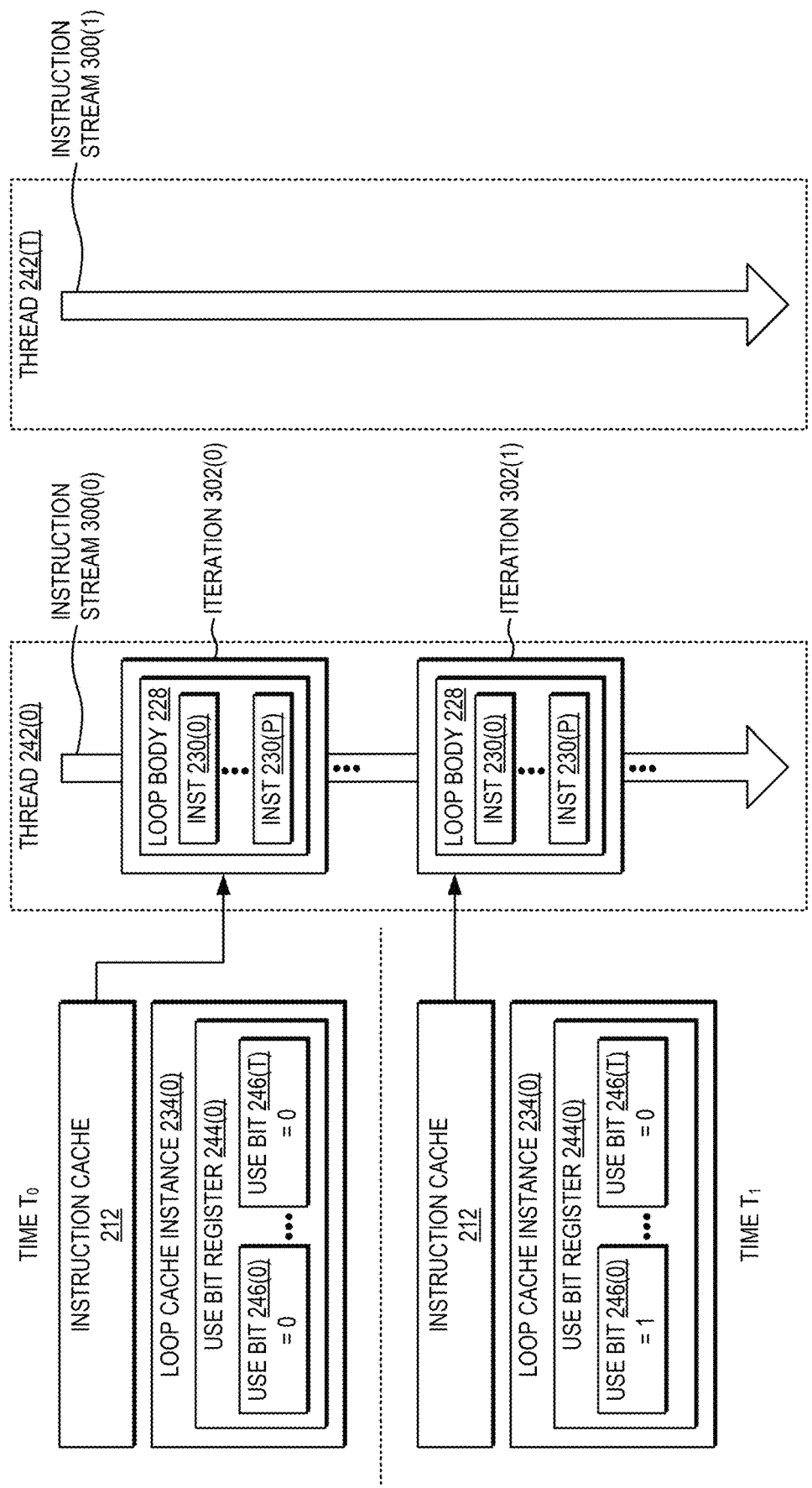
FIG. 3A-3D are diagrams illustrating exemplary operations performed by the loop cache controller circuit of FIG. 2 for sharing a loop cache instance between two (2) threads, according to some aspects.

In FIG. 3A, at time $T_0$, the loop cache controller circuit 232 detects an iteration 302(0) of the loop body 228 to be executed by the thread 242(0). Because the loop body 228 has not been previously identified in the instruction stream 300(0), the loop instructions 230(0)-230(P) are fetched from the instruction cache 212. At time $T_1$, the loop cache controller circuit 232 subsequently detects another iteration 302(1) of the loop body 228 to be executed by the thread 242(0), and sets the use bit 246(0) to a value of one (1) corresponding to the thread 242(0) to indicate that the loop cache instance 234(0) is associated with the thread 242(0). As the loop instructions 230(0)-230(P) are fetched from the instruction cache 212, the loop cache controller circuit 232 caches the loop instructions 230(0)-230(P) in the loop cache instance 234(0).

Figure 3B:
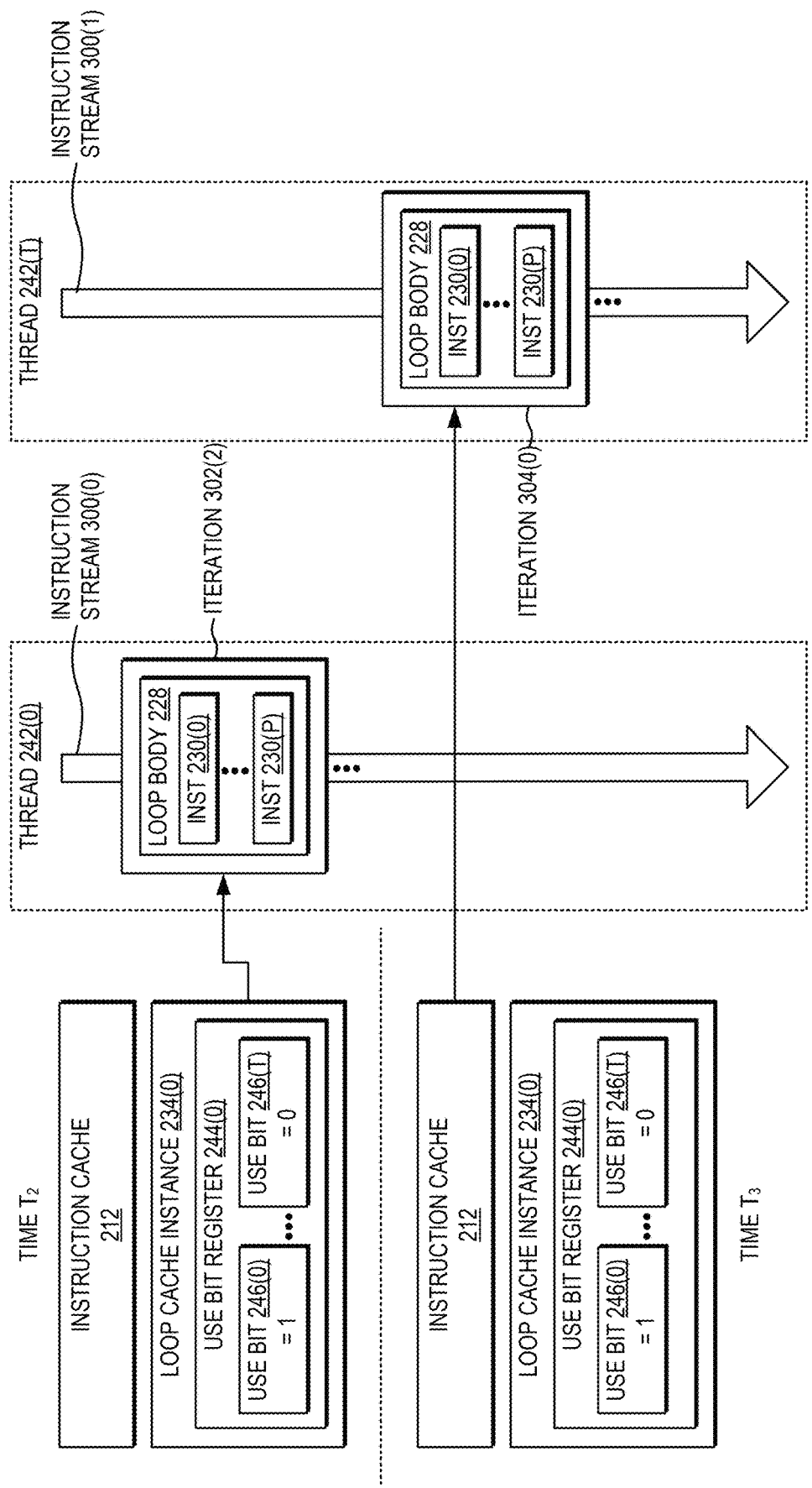

Referring now to FIG. 3B, the loop cache controller circuit 232 at time $T_2$ detects another iteration 302(2) of the loop body 228 to be executed by the thread 242(0). Because the loop instructions 230(0)-230(P) are now cached in the loop cache instance 234(0), which is associated with the thread 242(0) using the use bit 246(0), the loop cache controller circuit 232 retrieves the loop instructions 230(0)-230(P) from the loop cache instance 234(0) instead of the instruction cache 212 for this and subsequent iterations of the loop body 228 executed by the thread 242(0). The loop cache controller circuit 232 at time $T_3$ also detects an iteration 304(0) of the loop body 228, this time to be executed by the thread 242(T). The loop cache controller circuit 232 determines that the loop instructions 230(0)-230(P) were previously stored in the loop cache instance 234(0) that is presently associated only with the thread 242(0). This determination may be based on, e.g., identifying a match between the set and way of the loop instructions 230(0)-230(P) in the instruction cache 212 and the contents of tag registers 238(0)-238(C) of the loop cache instance 234(0) shown in FIG. 2, and further on the valid indicators 240(0)-240(C) of the loop cache instance 234(0) shown in FIG. 2. Because the loop body 228 has not been previously identified in the instruction stream 300(1), the loop instructions 230(0)-230(P) are fetched from the instruction cache 212.

Figure 3C:
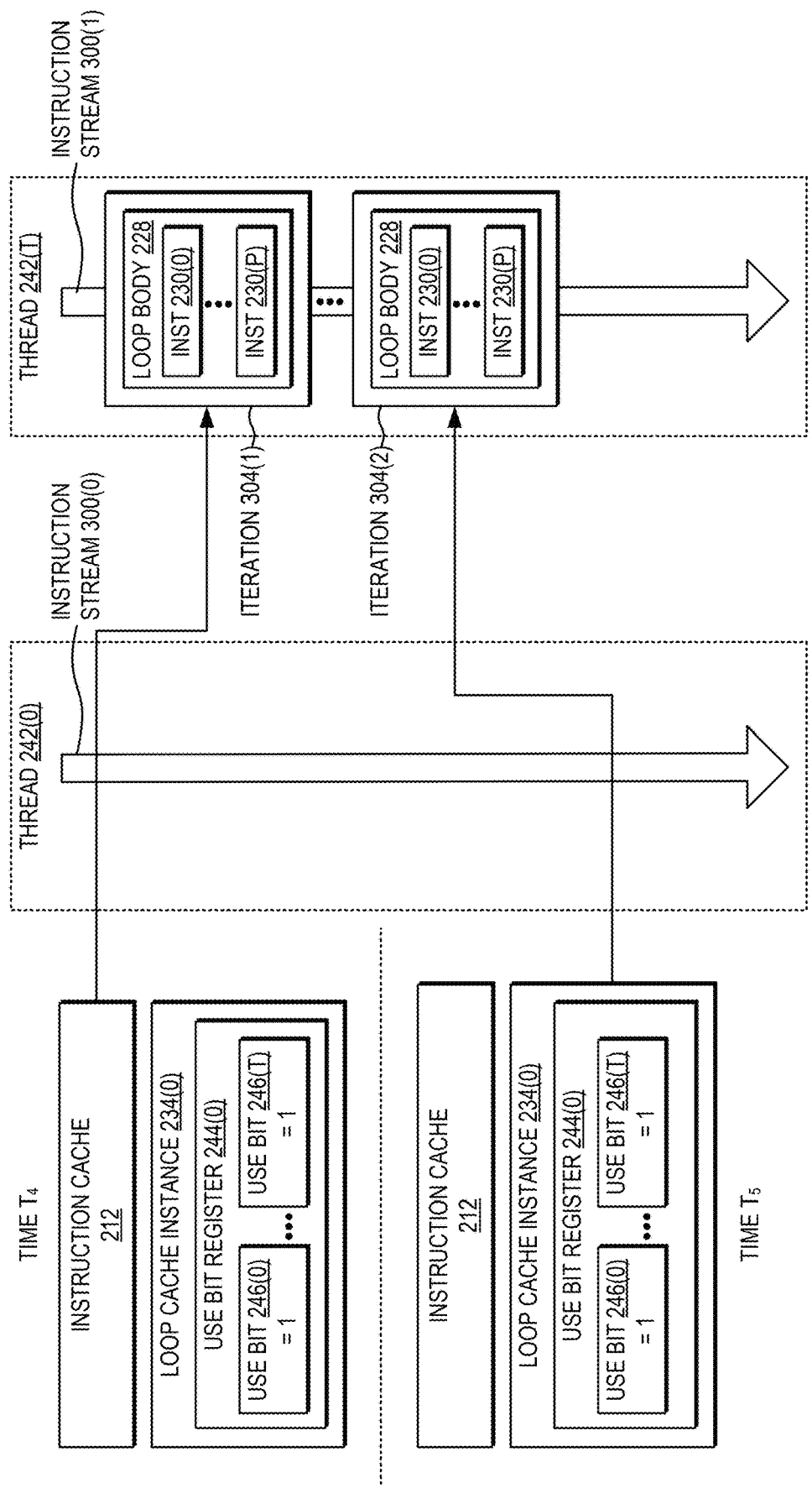

Turning now to FIG. 3C, at time $T_4$, the loop cache controller circuit 232 detects another iteration 304(1) of the loop body 228 to be executed by the thread 242(T). The loop cache controller circuit 232 thus sets the use bit 246(T) to a value of one (1) corresponding to the thread 242(T) to indicate that the loop cache instance 234(0) is associated with the thread 242(T). As the loop instructions 230(0)-230(P) fetched from the instruction cache 212, the loop cache controller circuit 232 in some aspects sets the valid indicators 240(0)-240(C) (not shown) of the loop cache instance 234(0). At this point, the loop cache instance 234(0) is usable by both the thread 242(0) and 242(T). Accordingly, when the loop cache controller circuit 232 detects yet another iteration 304(2) of the loop body 228 to be executed by the thread 242(T) at time $T_5$, the loop cache controller circuit 232 retrieves the loop instructions 230(0)-230(P) from the loop cache instance 234(0) instead of the instruction cache 212 for this and subsequent iterations of the loop body 228 executed by the thread 242(T).

Figure 3D:
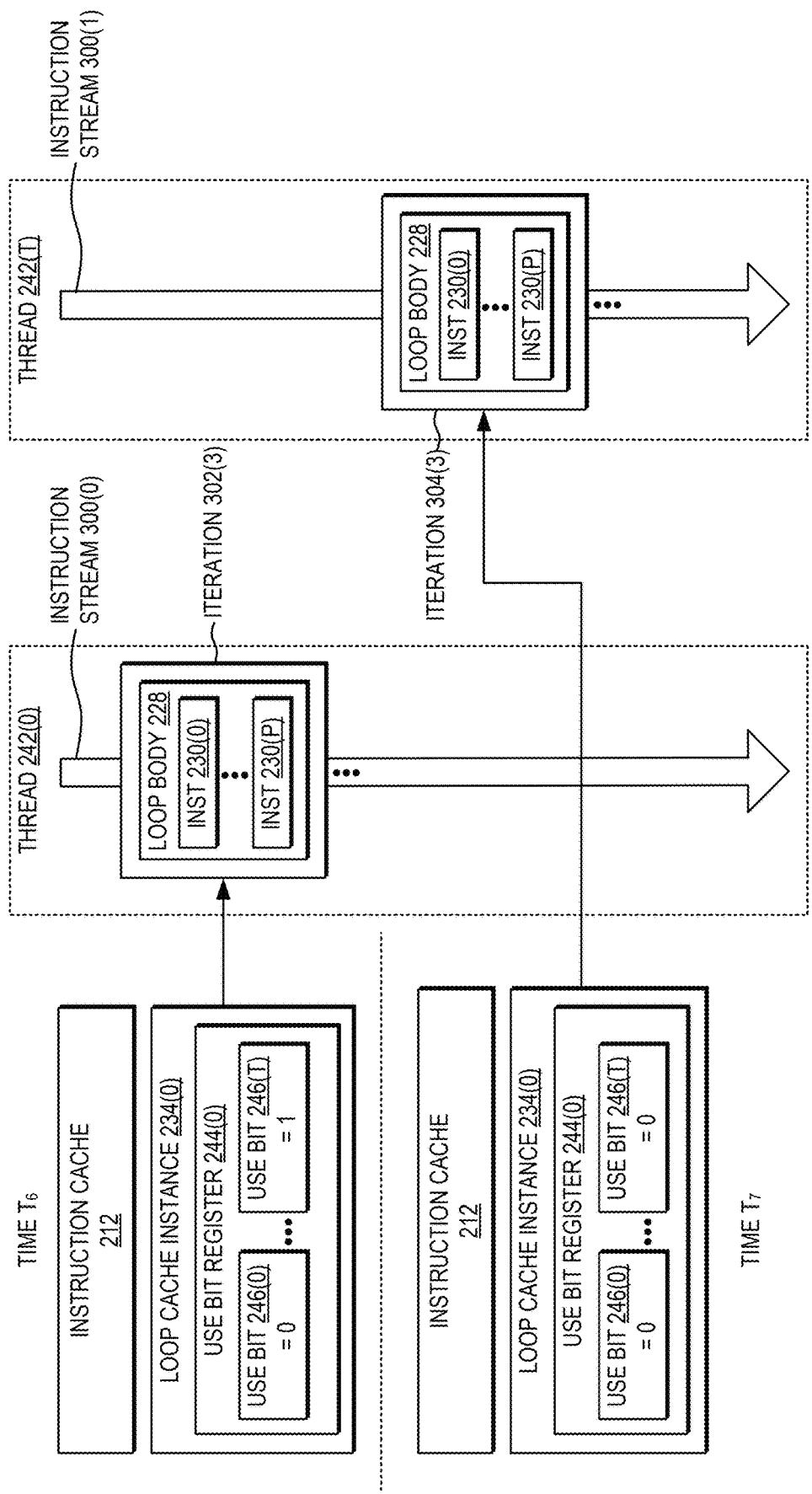

In FIG. 3D, the loop cache controller circuit 232 at time $T_6$ detects a last iteration 302(3) of the loop body to be executed by the thread 242(0). The loop cache controller circuit 232 retrieves the loop instructions 230(0)-230(P) from the loop cache instance 234(0), and then clears the use bit 246(0) corresponding to the thread 242(0) to indicate that the loop cache instance 234(0) is no longer associated with the thread 242(0). Similarly, at time $T_7$, the loop cache controller circuit 232 detects a last iteration 304(3) of the loop body to be executed by the thread 242(T), and retrieves the loop instructions 230(0)-230(P) from the loop cache instance 234(0). The loop cache controller circuit 232 then clears the use bit 246(0) corresponding to the thread 242(T) to indicate that the loop cache instance 234(0) is no longer associated with the thread 242(T).

While not shown in FIGS. 3A-3D, in some aspects, the loop cache controller circuit 232 may detect an eviction of a loop instruction (e.g., the loop instruction 230(0)) of the plurality of loop instructions 230(0)-230(P) from the instruction cache 212. In response, the loop cache controller circuit 232 clears a valid indicator 240(0) corresponding to the loop instruction 230(0).

Figure 4A:
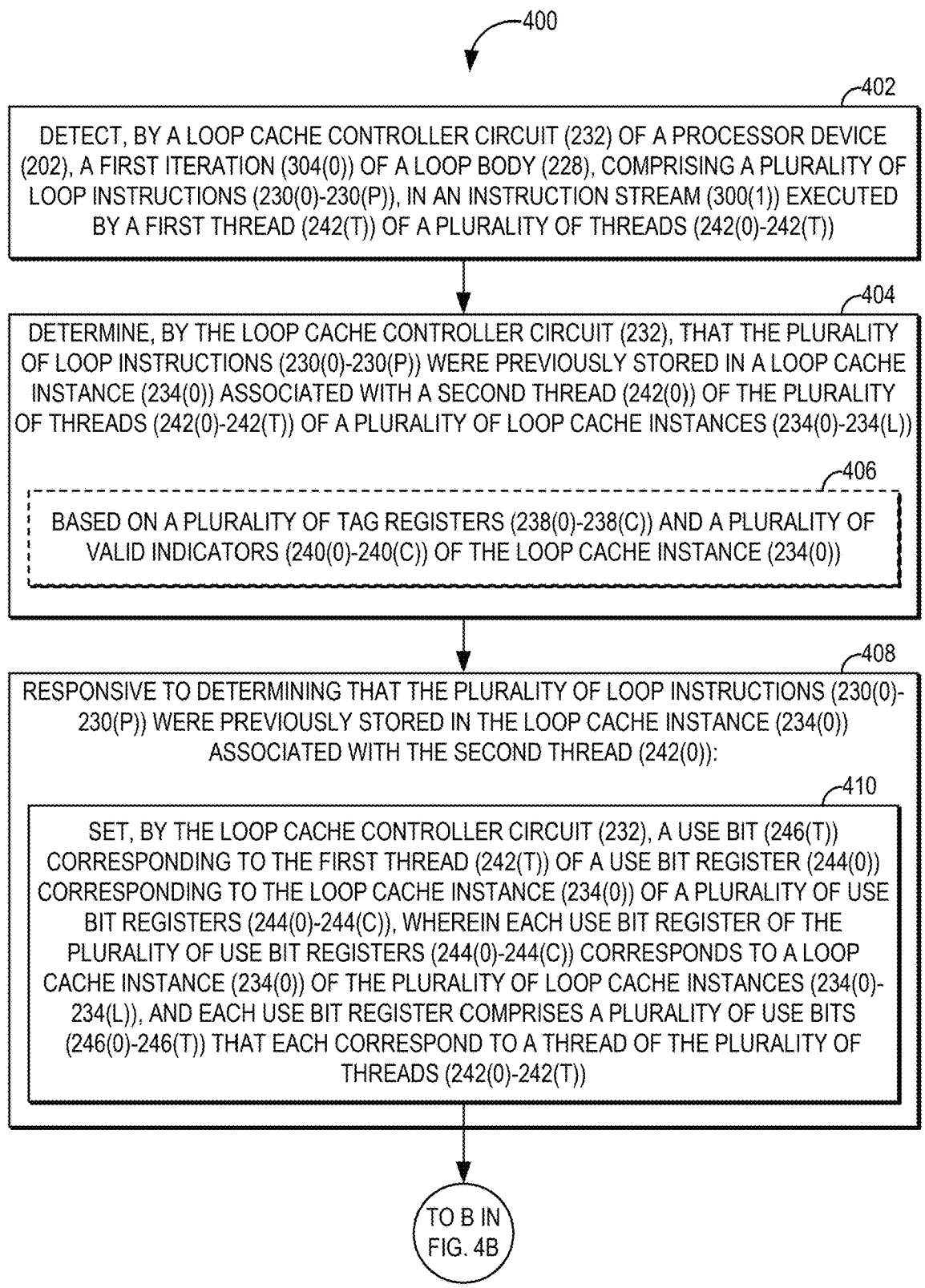
FIGS. 4A-4B are flowcharts illustrating exemplary operations performed by the loop cache controller circuit of FIG. 2 for sharing loop cache instances among multiple threads, according to some aspects.
Figure 4B:
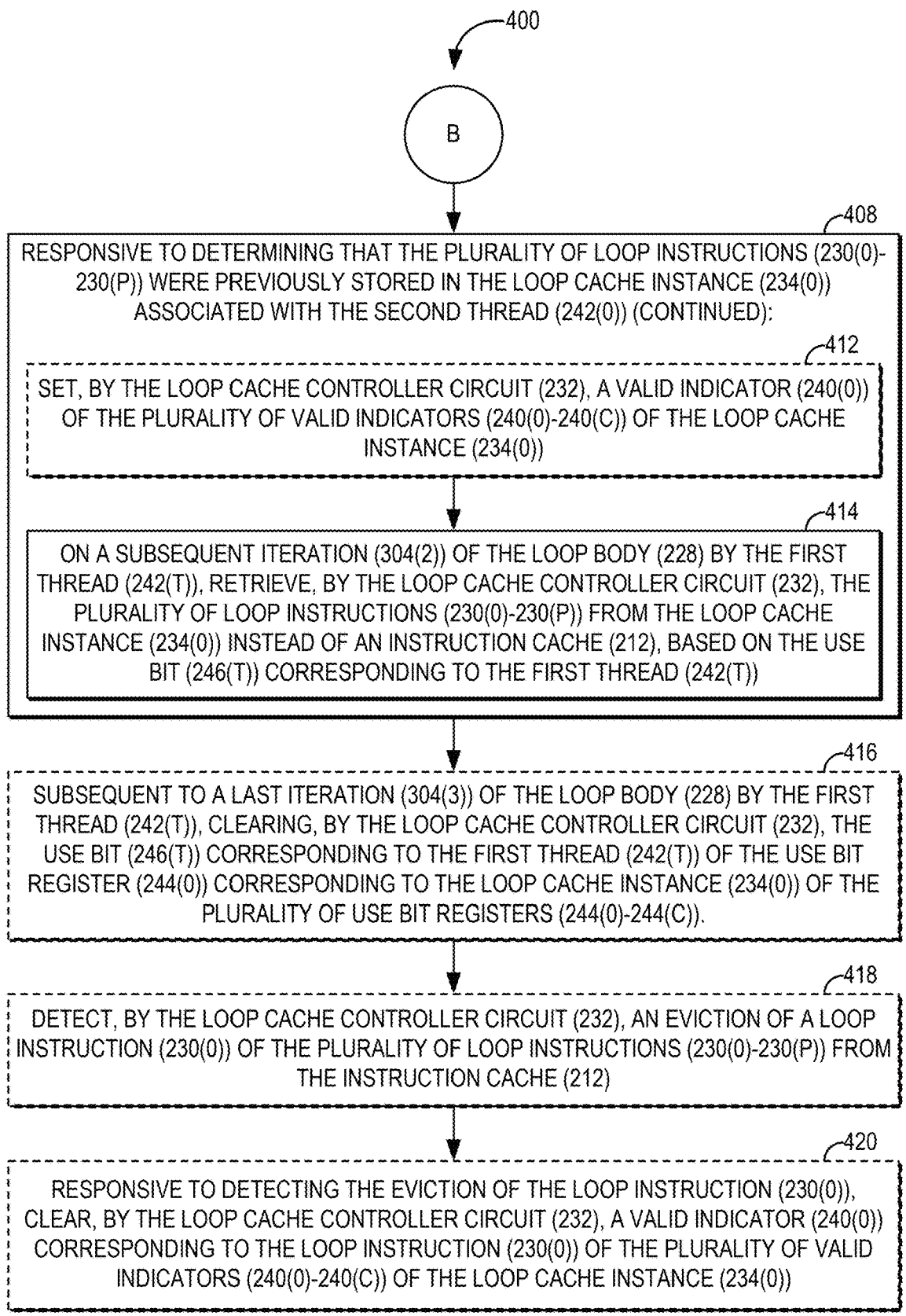

To illustrate operations performed by the loop cache controller circuit 232 of FIG. 2 for sharing loop cache instances among multiple threads according to some aspects, FIGS. 4A-4B provide a flowchart showing exemplary operations 400. For the sake of clarity, elements of FIGS. 2 and 3A-3D are referenced in describing FIGS. 4A-4B. It is to be understood that some aspects may provide that some operations illustrated in FIGS. 4A-4B may be performed in an order other than that illustrated herein, and/or may be omitted.

The exemplary operations 400 begin in FIG. 4A with a loop cache controller circuit (e.g., the loop cache controller circuit 232 of FIG. 2) of a processor device (such as the processor device 202 of FIG. 2) detecting a first iteration (e.g., the iteration 304(0) of FIG. 3B) of a loop body (such as the loop body 228 of FIGS. 2 and 3A-3D), comprising a plurality of loop instructions (e.g., the loop instructions 230(0)-230(P) of FIGS. 2 and 3A-3D) in an instruction stream (such as the instruction stream 300(1) of FIGS. 3A-3D) executed by a first thread (e.g., the thread 242(T) of FIGS. 2 and 3A-3D) of a plurality of threads (such as the threads 242(0)-242(T) of FIG. 2) (block 402). The loop cache controller circuit 232 determines that the plurality of loop instructions 230(0)-230(P) was previously stored in a loop cache instance (e.g., the loop cache instance 234(0) of FIGS. 2 and 3A-3D) associated with a second thread (such as the thread 242(0) of FIGS. 2 and 3A-3D) of the plurality of threads 242(0)-242(T) of a plurality of loop cache instances (e.g., the loop cache instances 234(0)-234(L) of FIG. 2) (block 404). In some aspects, the operations of block 404 for determining that the plurality of loop instruction 230(0)-230(P) was previously stored in the loop cache instance 234(0) are based on a plurality of tag registers (such as the tag registers 238(0)-238(C) of FIG. 2) and a plurality of valid indicators (e.g., the valid indicators 240(0)-240(C) of FIG. 2) of the loop cache instance 234(0) (block 406).

In response to determining that the plurality of loop instructions 230(0)-230(P) was previously stored in the loop cache instance 234(0) associated with the second thread 242(0), the loop cache controller circuit 232 performs a series of operations (block 408). The loop cache controller circuit 232 sets a use bit (such as the use bit 246(T) of FIGS. 2 and 3A-3D) corresponding to the first thread 242(T) of a use bit register (e.g., the use bit register 244(0) of FIGS. 2 and 3A-3D) corresponding to the loop cache instance 234(0) of a plurality of use bit registers (such as the use bit registers 244(0)-244(L) of FIG. 2), wherein each use bit register of the plurality of use bit registers 244(0)-244(L) corresponds to a loop cache instance 234(0) of the plurality of loop cache instances 234(0)-234(L), and each use bit register comprises a plurality of use bits (e.g., the use bits 246(0)-246(T) of FIGS. 2 and 3A-3D) that each correspond to a thread of the plurality of threads 242(0)-242(T) (block 410). The exemplary operations 400 continue in some aspects at block 412 of FIG. 4B.

Referring now to FIG. 4B, the operations of block 408 performed by the loop cache controller circuit 232 in response to determining that the plurality of loop instructions 230(0)-230(P) was previously stored in the loop cache instance 234(0) associated with the second thread 242(0) continue. According to some aspects, the loop cache controller circuit 232 also sets a valid indicator (e.g., the valid indicator 240(0) of FIG. 2) of the plurality of valid indicators 240(0)-240(C) of the loop cache instance 234(0) (block 412). On a subsequent iteration (such as the iteration 304(2) of FIG. 3C) of the loop body 228 by the first thread 242(T), the loop cache controller circuit 232 retrieves the plurality of loop instructions 230(0)-230(P) from the loop cache instance 234(0) instead of an instruction cache (e.g., the instruction cache 212 of FIGS. 2 and 3A-3D), based on the use bit 246(T) corresponding to the first thread 242(T) (block 414).

In some aspects, subsequent to a last iteration (such as the iteration 304(3) of FIG. 3D) of the loop body 228 by the first thread 242(T), the loop cache controller circuit 232 clears the use bit 246(T) corresponding to the first thread 242(T) of the use bit register 244(0) corresponding to the loop cache instance 234(0) of the plurality of use bit registers 244(0)-244(L) (block 416). Some aspects may further provide that the loop cache controller circuit 232 detects an eviction of a loop instruction 230(0) of the plurality of loop instructions 230(0)-230(P) from the instruction cache 212 (block 418). In response to detecting the eviction of the loop instruction 230(0), the loop cache controller circuit 232 in such aspects clears a valid indicator 240(0) corresponding to the loop instruction 230(0) of the plurality of valid indicators 240(0)-240(C) of the loop cache instance 234(0) (block 420).

Figure 5:
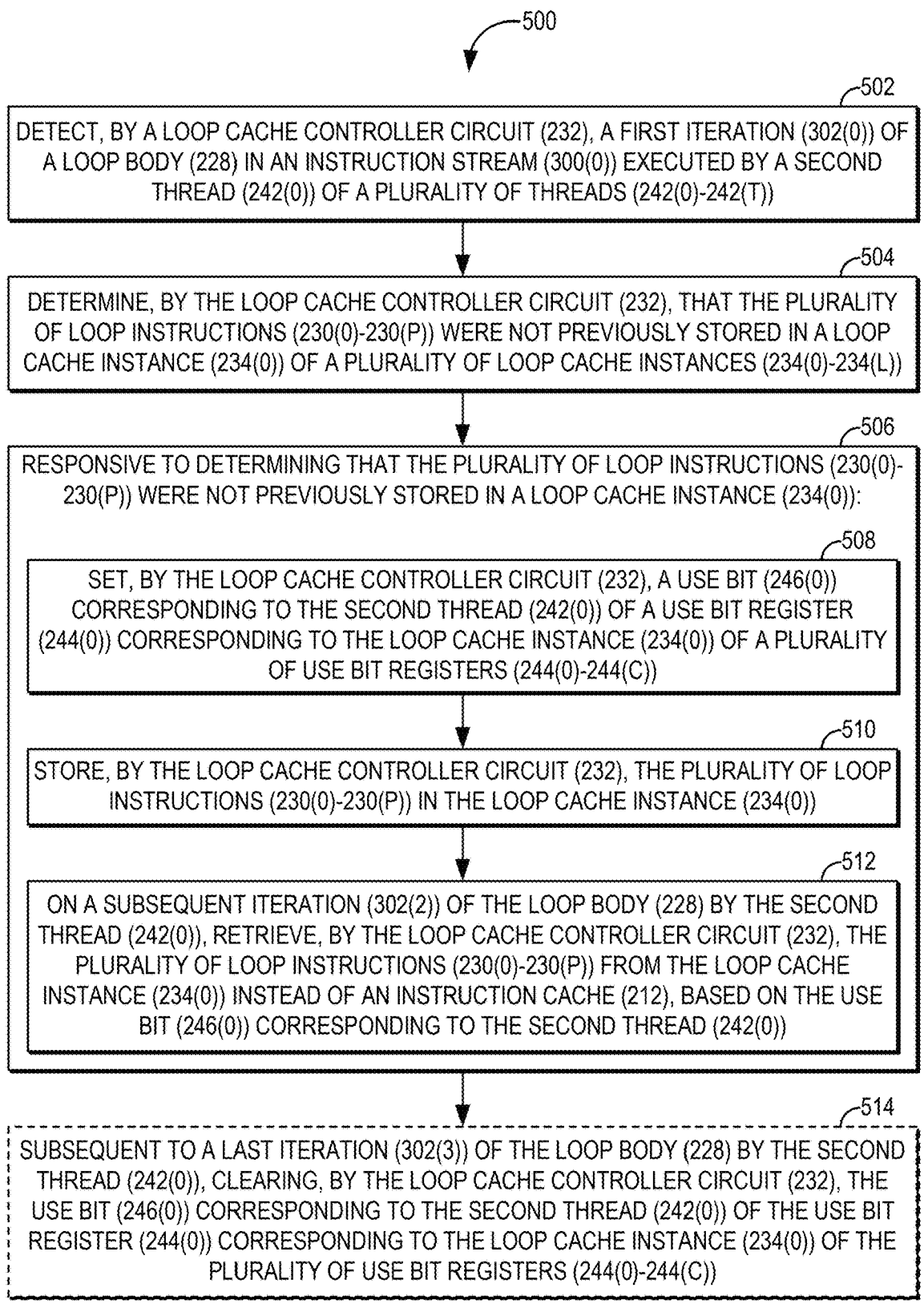
FIG. 5 is a flowchart illustrating further exemplary operations performed by the loop cache controller circuit of FIG. 2 for populating a loop cache instance with loop instructions upon first detecting a loop body, according to some aspects.

FIG. 5 provides a flowchart illustrating further exemplary operations 500 performed by the loop cache controller circuit of FIG. 2 for populating loop cache instances with loop instructions, according to some aspects. Elements of FIGS. 2 and 3A-3D are referenced in describing FIG. 5 for the sake of clarity. It is to be understood that some aspects may provide that some operations illustrated in FIG. 5 may be performed in an order other than that illustrated herein, and/or may be omitted.

In FIG. 5, a loop cache controller circuit (e.g., the loop cache controller circuit 232 of FIG. 2), detects a first iteration (such as the iteration 302(0) of FIG. 3A) of a loop body (e.g., the loop body 228 of FIGS. 2 and 3A-3D) in an instruction stream (such as the instruction stream 300(0) of FIGS. 3A-3D) executed by a second thread (e.g., the thread 242(0) of FIGS. 2 and 3A-3D) of a plurality of threads (such as the threads 242(0)-242(T) of FIGS. 2 and 3A-3D) (block 502). The loop cache controller circuit 232 determines that the plurality of loop instructions (such as the loop instructions 230(0)-230(P) of FIGS. 2 and 3A-3D) were not previously stored in a loop cache instance (e.g., the loop cache instance 234(0) of FIGS. 2 and 3A-3D) of a plurality of loop cache instances (such as the loop cache instances 234(0)-234(L) of FIG. 2) (block 504). In response to determining that the plurality of loop instructions 230(0)-230(P) were not previously stored in a loop cache instance 234(0), the loop cache controller circuit 232 performs a series of operations (block 506). The loop cache controller circuit 232 sets a use bit (e.g., the use bit 246(0) of FIGS. 2 and 3A-3D) corresponding to the second thread 242(0) of a use bit register (such as the use bit register 244(0) of FIGS. 2 and 3A-3D) corresponding to the loop cache instance 234(0) of a plurality of use bit registers (e.g., the use bit registers 244(0)-244(L) of FIG. 2) (block 508). The loop cache controller circuit 232 also stores the plurality of loop instructions 230(0)-230(P) in the loop cache instance 234(0) (block 510).

On a subsequent iteration (such as the iteration 302(2) of FIG. 3B) of the loop body 228 by the second thread 242(0), the loop cache controller circuit 232 retrieves the plurality of loop instructions 230(0)-230(P) from the loop cache instance 234(0) instead of an instruction cache (such as the instruction cache 212 of FIGS. 2 and 3A-3D), based on the use bit 246(0) corresponding to the second thread 242(0) (block 512). In some aspects, subsequent to a last iteration (e.g., the iteration 302(3) of FIG. 3D) of the loop body 228 by the second thread 242(0), the loop cache controller circuit 232 clears the use bit 246(0) corresponding to the second thread 242(0) of the use bit register 244(0) corresponding to the loop cache instance 234(0) of the plurality of use bit registers 244(0)-244(L) (block 514).

The processor device according to aspects disclosed herein and discussed with reference to FIGS. 2, 3A-3D, 4A-4B, and 5 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 6:
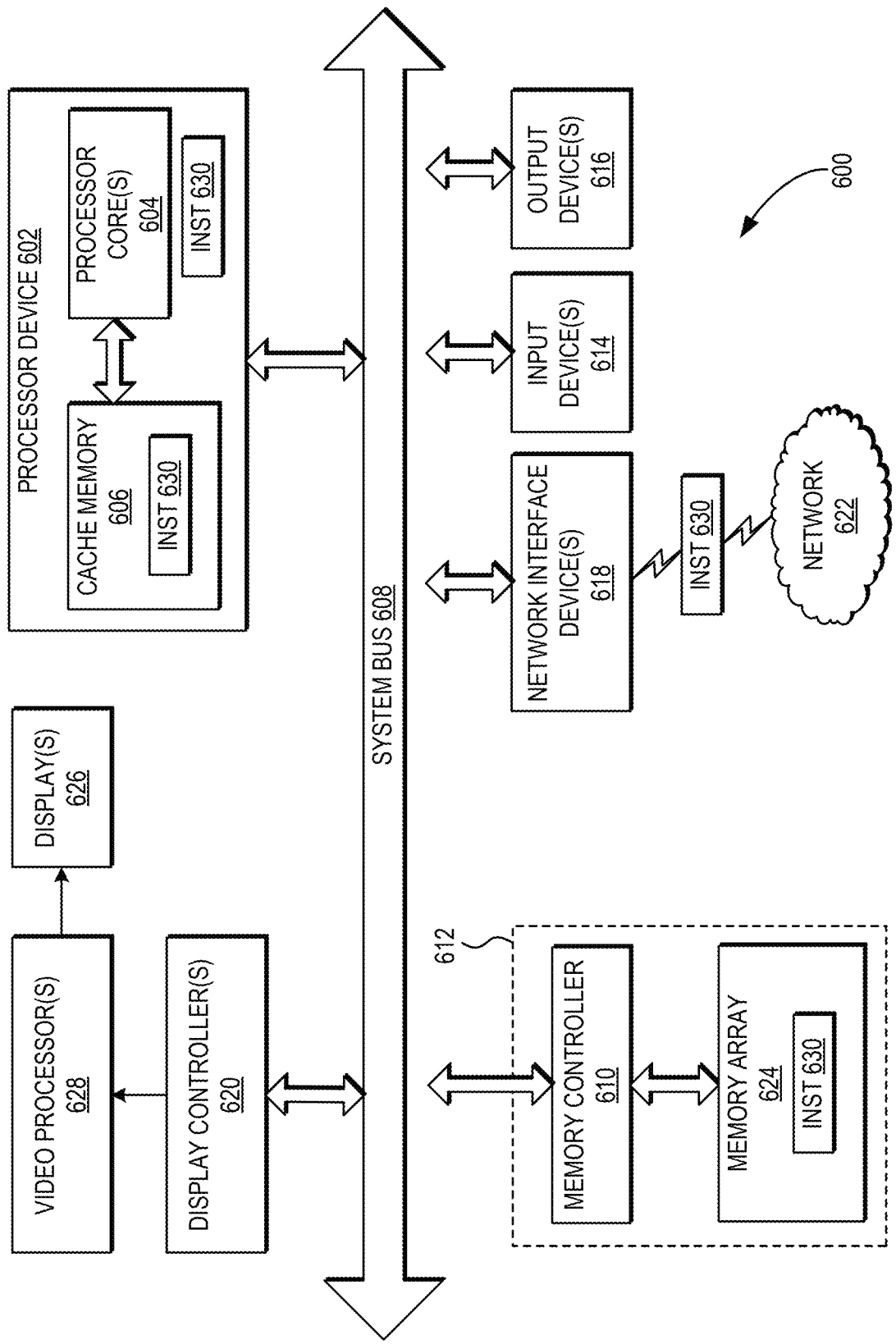
FIG. 6 is a block diagram of an exemplary processor-based device that can include the processor core of FIG. 1.

In this regard, FIG. 6 illustrates an example of a processor-based device 600, which corresponds in functionality to the processor-based device 200 of FIG. 2. In this example, the processor-based device 600 includes a processor device 602 (corresponding to the processor device 202 of FIG. 2) that comprises one or more processor cores 604 coupled to a cache memory 606. The processor device 602 is also coupled to a system bus 608 and can intercouple devices included in the processor-based device 600. As is well known, the processor device 602 communicates with these other devices by exchanging address, control, and data information over the system bus 608. For example, the processor device 602 can communicate bus transaction requests to a memory controller 610. Although not illustrated in FIG. 6, multiple system buses 608 could be provided, wherein each system bus 608 constitutes a different fabric.

Other devices may be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include the memory controller 610 coupled to one or more memory arrays 624.

The processor device 602 may also be configured to access the display controller(s) 620 over the system bus 608 to control information sent to one or more displays 626. The display controller(s) 620 sends information to the display(s)

626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, a light emitting diode (LED) display, etc.

The processor-based device 600 in FIG. 6 may include a set of instructions (captioned as "INST" in FIG. 6) 630 that may be executed by the processor device 602 for any application desired according to the instructions. The instructions 630 may be stored in the memory system 612, the processor device 602, and/or the cache memory 606, each of which may comprise an example of a non-transitory computer-readable medium. The instructions 630 may also reside, completely or at least partially, within the memory system 612 and/or within the processor device 602 during their execution. The instructions 630 may further be transmitted or received over the network 622, such that the network 622 may comprise an example of a computer-readable medium.

While the computer-readable medium is described in an exemplary embodiment herein to be a single medium, the term "computer-readable medium" should be taken to include a single medium or multiple media (e.g., a centralized or distributed database, and/or associated caches and servers) that store the set of instructions 630. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor device, comprising:
   a plurality of loop cache instances;
   a plurality of use bit registers, each corresponding to a loop cache instance of the plurality of loop cache instances, and each comprising a plurality of use bits that each correspond to a thread of a plurality of threads; and
   a loop cache controller circuit configured to:
   detect a first iteration of a loop body, comprising a plurality of loop instructions, in an instruction stream executed by a first thread of the plurality of threads;
   determine that the plurality of loop instructions were previously stored in a loop cache instance associated with a second thread of the plurality of threads of the plurality of loop cache instances; and responsive to determining that the plurality of loop instructions were previously stored in the loop cache instance associated with the second thread:
set a use bit corresponding to the first thread of a use bit register corresponding to the loop cache instance of the plurality of use bit registers; and
on a subsequent iteration of the loop body by the first thread, retrieve the plurality of loop instructions from the loop cache instance instead of an instruction cache, based on the use bit corresponding to the first thread.

2. The processor device of clause 1, wherein the loop cache controller circuit is further configured to, subsequent to a last iteration of the loop body by the first thread, clear the use bit corresponding to the first thread of the use bit register corresponding to the loop cache instance of the plurality of use bit registers.

3. The processor device of any one of clauses 1-2, wherein the loop cache controller circuit is further configured to, prior to detecting the first iteration of the loop body in the instruction stream executed by the first thread:
detect a first iteration of the loop body in the instruction stream executed by the second thread of the plurality of threads;
determine that the plurality of loop instructions were not previously stored in the loop cache instance of the plurality of loop cache instances; and
responsive to determining that the plurality of loop instructions were not previously stored in the loop cache instance:
set a use bit corresponding to the second thread of the use bit register corresponding to the loop cache instance of the plurality of use bit registers;
store the plurality of loop instructions in the loop cache instance; and
on a subsequent iteration of the loop body by the second thread, retrieve the plurality of loop instructions from the loop cache instance instead of the instruction cache, based on the use bit corresponding to the second thread.

4. The processor device of clause 3, wherein the loop cache controller circuit is further configured to, subsequent to a last iteration of the loop body by the second thread, clear the use bit corresponding to the second thread of the use bit register corresponding to the loop cache instance of the plurality of use bit registers.

5. The processor device of any one of clauses 1-4, wherein:
each loop cache instance of the plurality of loop cache instances comprises:
a plurality of data registers;
a plurality of tag registers, each corresponding to a data register of the plurality of data registers; and
a plurality of valid indicators, each corresponding to a data register of the plurality of data registers; and
the loop cache controller circuit is configured to determine that the plurality of loop instructions were previously stored in the loop cache instance based on the plurality of tag registers and the plurality of valid indicators of the loop cache instance.

6. The processor device of clause 5, wherein the loop cache controller circuit is further configured to, responsive to determining that the plurality of loop instructions were previously stored in the loop cache instance associated with the second thread, set a valid indicator of the plurality of valid indicators of the loop cache instance.

7. The processor device of any one of clauses 5-6, wherein the loop cache controller circuit is further configured to:

detect an eviction of a loop instruction of the plurality of loop instructions from the instruction cache; and
responsive to detecting the eviction of the loop instruction, clear a valid indicator corresponding to the loop instruction of the plurality of valid indicators of the loop cache instance.

8. The processor device of any one of clauses 1-7, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A processor device, comprising:
means for detecting a first iteration of a loop body, comprising a plurality of loop instructions, in an instruction stream executed by a first thread of a plurality of threads;
means for determining that the plurality of loop instructions were previously stored in a loop cache instance associated with a second thread of the plurality of threads of a plurality of loop cache instances;
means for setting a use bit corresponding to the first thread of a use bit register corresponding to the loop cache instance of a plurality of use bit registers, responsive to determining that the plurality of loop instructions were previously stored in the loop cache instance associated with the second thread, wherein:
each use bit register of the plurality of use bit registers corresponds to a loop cache instance of the plurality of loop cache instances; and
each use bit register comprises a plurality of use bits that each correspond to a thread of the plurality of threads; and
means for retrieving the plurality of loop instructions from the loop cache instance instead of an instruction cache, based on the use bit corresponding to the first thread, on a subsequent iteration of the loop body by the first thread.

10. A method for sharing loop cache instances among multiple threads in processor devices, the method comprising:
detecting, by a loop cache controller circuit of a processor device, a first iteration of a loop body, comprising a plurality of loop instructions, in an instruction stream executed by a first thread of a plurality of threads;
determining, by the loop cache controller circuit, that the plurality of loop instructions were previously stored in a loop cache instance associated with a second thread of the plurality of threads of a plurality of loop cache instances; and
responsive to determining that the plurality of loop instructions were previously stored in the loop cache instance associated with the second thread:
setting, by the loop cache controller circuit, a use bit corresponding to the first thread of a use bit register corresponding to the loop cache instance of a plurality of use bit registers, wherein:

each use bit register of the plurality of use bit registers corresponds to a loop cache instance of the plurality of loop cache instances; and each use bit register comprises a plurality of use bits that each correspond to a thread of the plurality of threads; and on a subsequent iteration of the loop body by the first thread, retrieving, by the loop cache controller circuit, the plurality of loop instructions from the loop cache instance instead of an instruction cache, based on the use bit corresponding to the first thread.

11. The method of clause 10, further comprising, subsequent to a last iteration of the loop body by the first thread, clearing, by the loop cache controller circuit, the use bit corresponding to the first thread of the use bit register corresponding to the loop cache instance of the plurality of use bit registers.

12. The method of any one of clauses 10-11, further comprising, prior to detecting the first iteration of the loop body in the instruction stream executed by the first thread:

detecting, by the loop cache controller circuit, a first iteration of the loop body in the instruction stream executed by the second thread of the plurality of threads;

determining, by the loop cache controller circuit, that the plurality of loop instructions were not previously stored in the loop cache instance of the plurality of loop cache instances; and responsive to determining that the plurality of loop instructions were not previously stored in the loop cache instance:

setting, by the loop cache controller circuit, a use bit corresponding to the second thread of the use bit register corresponding to the loop cache instance of the plurality of use bit registers;

storing, by the loop cache controller circuit, the plurality of loop instructions in the loop cache instance; and on a subsequent iteration of the loop body by the second thread, retrieving, by the loop cache controller circuit, the plurality of loop instructions from the loop cache instance instead of the instruction cache, based on the use bit corresponding to the second thread.

13. The method of clause 12, further comprising, subsequent to a last iteration of the loop body by the second thread, clearing, by the loop cache controller circuit, the use bit corresponding to the second thread of the use bit register corresponding to the loop cache instance of the plurality of use bit registers.

14. The method of any one of clauses 10-13, wherein:
each loop cache instance of the plurality of loop cache instances comprises:
  a plurality of data registers;
  a plurality of tag registers, each corresponding to a data register of the plurality of data registers; and
  a plurality of valid indicators, each corresponding to a data register of the plurality of data registers; and
determining that the plurality of loop instructions were previously stored in the loop cache instance is based on the plurality of tag registers and the plurality of valid indicators of the loop cache instance.

15. The method of clause 14, further comprising, responsive to determining that the plurality of loop instructions were previously stored in the loop cache instance associated with the second thread, setting, by the loop cache controller circuit, a valid indicator of the plurality of valid indicators of the loop cache instance.

16. The method of any one of clauses 14-15, further comprising:

detecting, by the loop cache controller circuit, an eviction of a loop instruction of the plurality of loop instructions from the instruction cache; and responsive to detecting the eviction of the loop instruction, clearing, by the loop cache controller circuit, a valid indicator corresponding to the loop instruction of a plurality of valid indicators of the loop cache instance.

17. A non-transitory computer-readable medium, having stored thereon computer-executable instructions that, when executed by a processor device, cause the processor device to:

detect a first iteration of a loop body, comprising a plurality of loop instructions, in an instruction stream executed by a first thread of a plurality of threads;

determine that the plurality of loop instructions were previously stored in a loop cache instance associated with a second thread of the plurality of threads of a plurality of loop cache instances; and responsive to determining that the plurality of loop instructions were previously stored in the loop cache instance associated with the second thread:

set a use bit corresponding to the first thread of a use bit register corresponding to the loop cache instance of a plurality of use bit registers, wherein:
  each use bit register of the plurality of use bit registers corresponds to a loop cache instance of the plurality of loop cache instances; and
  each use bit register comprises a plurality of use bits that each correspond to a thread of the plurality of threads; and on a subsequent iteration of the loop body by the first thread, retrieve the plurality of loop instructions from the loop cache instance instead of an instruction cache, based on the use bit corresponding to the first thread.

18. The non-transitory computer-readable medium of clause 17, wherein the computer-executable instructions further cause the processor device to, subsequent to a last iteration of the loop body by the first thread, clear the use bit corresponding to the first thread of the use bit register corresponding to the loop cache instance of the plurality of use bit registers.

19. The non-transitory computer-readable medium of any one of clauses 17-18, wherein the computer-executable instructions further cause the processor device to, prior to detecting the first iteration of the loop body in the instruction stream executed by the first thread:

detect a first iteration of the loop body in the instruction stream executed by the second thread of the plurality of threads;

determine that the plurality of loop instructions were not previously stored in the loop cache instance of the plurality of loop cache instances; and responsive to determining that the plurality of loop instructions were not previously stored in the loop cache instance:

set a use bit corresponding to the second thread of the use bit register corresponding to the loop cache instance of the plurality of use bit registers;

store the plurality of loop instructions in the loop cache instance; and on a subsequent iteration of the loop body by the second thread, retrieve the plurality of loop instructions from the loop cache instance instead of the instruction cache, based on the use bit corresponding to the second thread.

20 The non-transitory computer-readable medium of any one of clauses 17-19, wherein the computer-executable instructions further cause the processor device to:
  detect an eviction of a loop instruction of the plurality of loop instructions from the instruction cache; and
  responsive to detecting the eviction of the loop instruction, clear a valid indicator corresponding to the loop instruction of a plurality of valid indicators of the loop cache instance.

What is claimed is:

1. A processor device, comprising:
  a plurality of loop cache instances;
  a plurality of use bit registers, each corresponding to a loop cache instance of the plurality of loop cache instances, and each comprising a plurality of use bits that each correspond to a thread of a plurality of threads; and
  a loop cache controller circuit configured to:
    detect a first iteration of a loop body, comprising a plurality of loop instructions, in an instruction stream executed by a first thread of the plurality of threads;
    determine that the plurality of loop instructions were previously stored in a loop cache instance associated with a second thread of the plurality of threads of the plurality of loop cache instances; and
    responsive to determining that the plurality of loop instructions were previously stored in the loop cache instance associated with the second thread:
      set a use bit corresponding to the first thread of a use bit register corresponding to the loop cache instance of the plurality of use bit registers; and
      on a subsequent iteration of the loop body by the first thread, retrieve the plurality of loop instructions from the loop cache instance instead of an instruction cache, based on the use bit corresponding to the first thread.

2. The processor device of claim 1, wherein the loop cache controller circuit is further configured to, subsequent to a last iteration of the loop body by the first thread, clear the use bit corresponding to the first thread of the use bit register corresponding to the loop cache instance of the plurality of use bit registers.

3. The processor device of claim 1, wherein the loop cache controller circuit is further configured to, prior to detecting the first iteration of the loop body in the instruction stream executed by the first thread:
  detect a first iteration of the loop body in the instruction stream executed by the second thread of the plurality of threads;
  determine that the plurality of loop instructions were not previously stored in the loop cache instance of the plurality of loop cache instances; and
  responsive to determining that the plurality of loop instructions were not previously stored in the loop cache instance:
    set a use bit corresponding to the second thread of the use bit register corresponding to the loop cache instance of the plurality of use bit registers;
    store the plurality of loop instructions in the loop cache instance; and
    on a subsequent iteration of the loop body by the second thread, retrieve the plurality of loop instructions from the loop cache instance instead of the instruction cache, based on the use bit corresponding to the second thread.

4. The processor device of claim 3, wherein the loop cache controller circuit is further configured to, subsequent to a last iteration of the loop body by the second thread, clear the use bit corresponding to the second thread of the use bit register corresponding to the loop cache instance of the plurality of use bit registers.

5. The processor device of claim 1, wherein:
  each loop cache instance of the plurality of loop cache instances comprises:
    a plurality of data registers;
    a plurality of tag registers, each corresponding to a data register of the plurality of data registers; and
    a plurality of valid indicators, each corresponding to a data register of the plurality of data registers; and
  the loop cache controller circuit is configured to determine that the plurality of loop instructions were previously stored in the loop cache instance based on the plurality of tag registers and the plurality of valid indicators of the loop cache instance.

6. The processor device of claim 5, wherein the loop cache controller circuit is further configured to, responsive to determining that the plurality of loop instructions were previously stored in the loop cache instance associated with the second thread, set a valid indicator of the plurality of valid indicators of the loop cache instance.

7. The processor device of claim 5, wherein the loop cache controller circuit is further configured to:
  detect an eviction of a loop instruction of the plurality of loop instructions from the instruction cache; and
  responsive to detecting the eviction of the loop instruction, clear a valid indicator corresponding to the loop instruction of the plurality of valid indicators of the loop cache instance.

8. The processor device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A processor device, comprising:
  means for detecting a first iteration of a loop body, comprising a plurality of loop instructions, in an instruction stream executed by a first thread of a plurality of threads;
  means for determining that the plurality of loop instructions were previously stored in a loop cache instance associated with a second thread of the plurality of threads of a plurality of loop cache instances;
  means for setting a use bit corresponding to the first thread of a use bit register corresponding to the loop cache instance of a plurality of use bit registers, responsive to determining that the plurality of loop instructions were previously stored in the loop cache instance associated with the second thread, wherein:

each use bit register of the plurality of use bit registers corresponds to a loop cache instance of the plurality of loop cache instances; and each use bit register comprises a plurality of use bits that each correspond to a thread of the plurality of threads; and means for retrieving the plurality of loop instructions from the loop cache instance instead of an instruction cache, based on the use bit corresponding to the first thread, on a subsequent iteration of the loop body by the first thread.

10. A method for sharing loop cache instances among multiple threads in processor devices, the method comprising:

detecting, by a loop cache controller circuit of a processor device, a first iteration of a loop body, comprising a plurality of loop instructions, in an instruction stream executed by a first thread of a plurality of threads;

determining, by the loop cache controller circuit, that the plurality of loop instructions were previously stored in a loop cache instance associated with a second thread of the plurality of threads of a plurality of loop cache instances; and responsive to determining that the plurality of loop instructions were previously stored in the loop cache instance associated with the second thread:

setting, by the loop cache controller circuit, a use bit corresponding to the first thread of a use bit register corresponding to the loop cache instance of a plurality of use bit registers, wherein:

each use bit register of the plurality of use bit registers corresponds to a loop cache instance of the plurality of loop cache instances; and each use bit register comprises a plurality of use bits that each correspond to a thread of the plurality of threads; and on a subsequent iteration of the loop body by the first thread, retrieving, by the loop cache controller circuit, the plurality of loop instructions from the loop cache instance instead of an instruction cache, based on the use bit corresponding to the first thread.

11. The method of claim 10, further comprising, subsequent to a last iteration of the loop body by the first thread, clearing, by the loop cache controller circuit, the use bit corresponding to the first thread of the use bit register corresponding to the loop cache instance of the plurality of use bit registers.

12. The method of claim 10, further comprising, prior to detecting the first iteration of the loop body in the instruction stream executed by the first thread:

detecting, by the loop cache controller circuit, a first iteration of the loop body in the instruction stream executed by the second thread of the plurality of threads;

determining, by the loop cache controller circuit, that the plurality of loop instructions were not previously stored in the loop cache instance of the plurality of loop cache instances; and responsive to determining that the plurality of loop instructions were not previously stored in the loop cache instance:

setting, by the loop cache controller circuit, a use bit corresponding to the second thread of the use bit register corresponding to the loop cache instance of the plurality of use bit registers;

storing, by the loop cache controller circuit, the plurality of loop instructions in the loop cache instance; and on a subsequent iteration of the loop body by the second thread, retrieving, by the loop cache controller circuit, the plurality of loop instructions from the loop cache instance instead of the instruction cache, based on the use bit corresponding to the second thread.

13. The method of claim 12, further comprising, subsequent to a last iteration of the loop body by the second thread, clearing, by the loop cache controller circuit, the use bit corresponding to the second thread of the use bit register corresponding to the loop cache instance of the plurality of use bit registers.

14. The method of claim 10, wherein:

each loop cache instance of the plurality of loop cache instances comprises:

a plurality of data registers;

a plurality of tag registers, each corresponding to a data register of the plurality of data registers; and a plurality of valid indicators, each corresponding to a data register of the plurality of data registers; and determining that the plurality of loop instructions were previously stored in the loop cache instance is based on the plurality of tag registers and the plurality of valid indicators of the loop cache instance.

15. The method of claim 14, further comprising, responsive to determining that the plurality of loop instructions were previously stored in the loop cache instance associated with the second thread, setting, by the loop cache controller circuit, a valid indicator of the plurality of valid indicators of the loop cache instance.

16. The method of claim 14, further comprising:

detecting, by the loop cache controller circuit, an eviction of a loop instruction of the plurality of loop instructions from the instruction cache; and responsive to detecting the eviction of the loop instruction, clearing, by the loop cache controller circuit, a valid indicator corresponding to the loop instruction of a plurality of valid indicators of the loop cache instance.

17. A non-transitory computer-readable medium, having stored thereon computer-executable instructions that, when executed by a processor device, cause the processor device to:

detect a first iteration of a loop body, comprising a plurality of loop instructions, in an instruction stream executed by a first thread of a plurality of threads;

determine that the plurality of loop instructions were previously stored in a loop cache instance associated with a second thread of the plurality of threads of a plurality of loop cache instances; and responsive to determining that the plurality of loop instructions were previously stored in the loop cache instance associated with the second thread:

set a use bit corresponding to the first thread of a use bit register corresponding to the loop cache instance of a plurality of use bit registers, wherein:

each use bit register of the plurality of use bit registers corresponds to a loop cache instance of the plurality of loop cache instances; and each use bit register comprises a plurality of use bits that each correspond to a thread of the plurality of threads; and on a subsequent iteration of the loop body by the first thread, retrieve the plurality of loop instructions from the loop cache instance instead of an instruction cache, based on the use bit corresponding to the first thread.

18. The non-transitory computer-readable medium of claim 17, wherein the computer-executable instructions further cause the processor device to, subsequent to a last iteration of the loop body by the first thread, clear the use bit corresponding to the first thread of the use bit register corresponding to the loop cache instance of the plurality of use bit registers.

19. The non-transitory computer-readable medium of claim 17, wherein the computer-executable instructions further cause the processor device to, prior to detecting the first iteration of the loop body in the instruction stream executed by the first thread:

detect a first iteration of the loop body in the instruction stream executed by the second thread of the plurality of threads;

determine that the plurality of loop instructions were not previously stored in the loop cache instance of the plurality of loop cache instances; and responsive to determining that the plurality of loop instructions were not previously stored in the loop cache instance:

set a use bit corresponding to the second thread of the use bit register corresponding to the loop cache instance of the plurality of use bit registers;

store the plurality of loop instructions in the loop cache instance; and on a subsequent iteration of the loop body by the second thread, retrieve the plurality of loop instructions from the loop cache instance instead of the instruction cache, based on the use bit corresponding to the second thread.

20. The non-transitory computer-readable medium of claim 17, wherein the computer-executable instructions further cause the processor device to:

detect an eviction of a loop instruction of the plurality of loop instructions from the instruction cache; and responsive to detecting the eviction of the loop instruction, clear a valid indicator corresponding to the loop instruction of a plurality of valid indicators of the loop cache instance.

* * * * *